Patented Dec. 11, 1923.

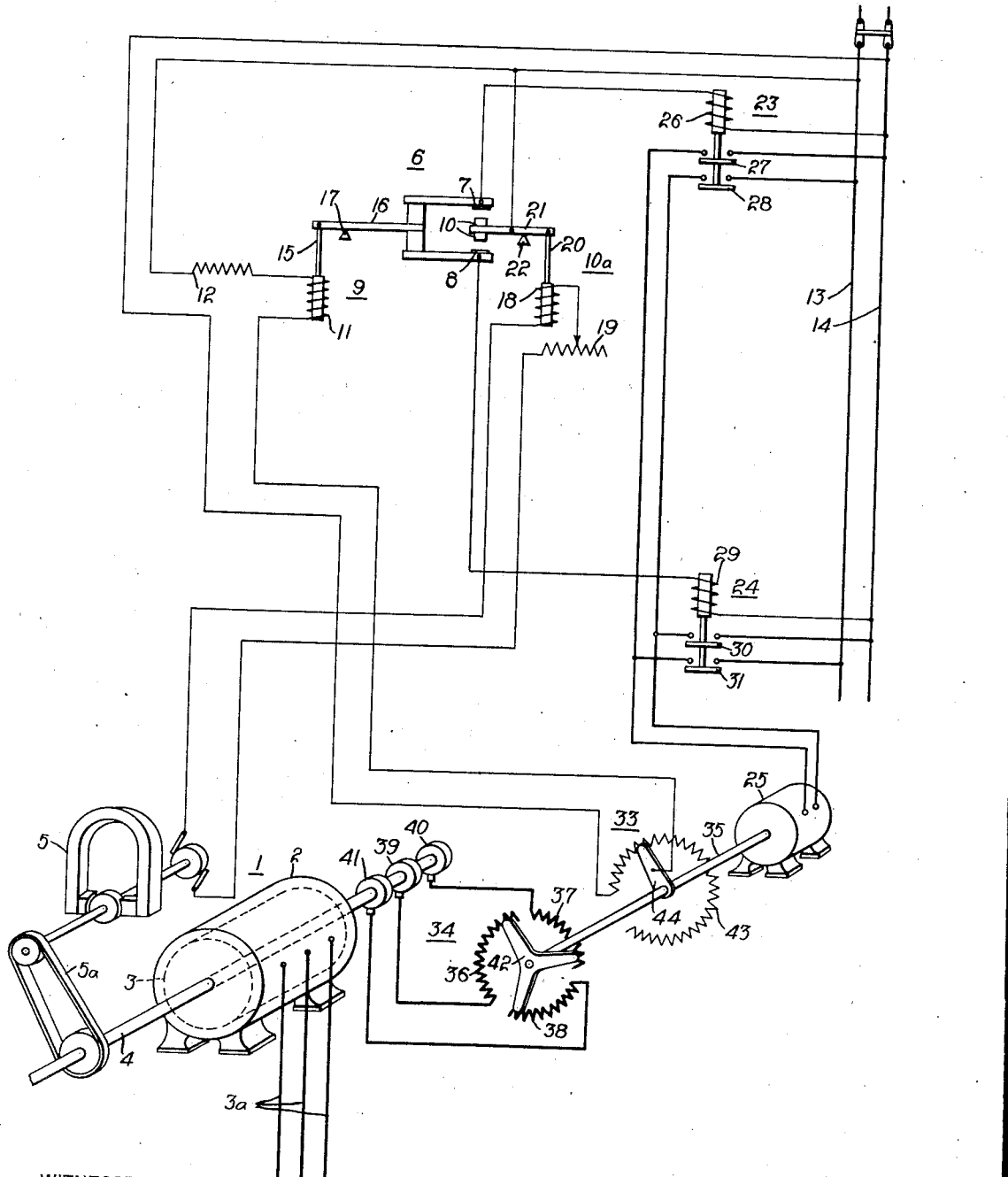

1,477,309

UNITED STATES PATENT OFFICE.

WILLIAM M. BRADSHAW, OF WILKINSBURG, AND CLARENCE A. BODDIE, OF PITTSBURGH, PENNSYLVANIA, ASSIGNORS TO WESTINGHOUSE ELECTRIC AND MANUFACTURING COMPANY, A CORPORATION OF PENNSYLVANIA.

SPEED-REGULATOR SYSTEM.

Application filed April 9, 1919. Serial No. 288,761.

*To all whom it may concern:*

Be it known that we, WILLIAM M. BRADSHAW, a citizen of the United States, and a resident of Wilkinsburg, in the county of Allegheny and State of Pennsylvania, and CLARENCE A. BODDIE, a citizen of the United States, and a resident of Pittsburgh, in the county of Allegheny and State of Pennsylvania, have invented a new and useful Improvement in Speed-Regulator Systems, of which the following is a specification.

Our invention relates to regulator systems and particularly to regulator systems for maintaining the speeds of dynamo-electric machines substantially constant.

One object of our invention is to provide a regulator system of the above-indicated type that shall maintain the speed of an induction motor substantially constant in a simple and an economical manner and be substantially free from all hunting action.

In many industrial establishments, such as steel mills, it is convenient, and, in some cases, necessary to connect motors that are to be operated at a constant speed and motors that are to be operated at variable speeds to a single supply circuit. In such cases, it is difficult to obtain satisfactory operation of the constant-speed motors by reason of the variation in the supply-circuit voltage that is effected by the variable speed motors.

Heretofore, when a number of induction motors have been connected to an alternating-current supply circuit, it has been customary to vary, by a suitable hand-control device, the resistance that is included in the circuit of the rotor field winding of a motor that is to be operated at a constant speed. Such hand-control has proved very unsatisfactory and inappropriate for many classes of service.

In a regulator system constructed in accordance with our invention, an induction motor of the wound-rotor type, which is connected to a variable source of power and is adapted to perform any suitable work, is governed by an automatic regulator to maintain the speed of the motor substantially constant, irrespective of the variations of the supply-circuit voltage. The regulator proper embodies a main control electromagnet which is energized by a suitable generator in accordance with the speed of the induction motor, main contact members which are operated by the main control magnet, and an auxiliary magnet for governing the operation of an auxiliary motor. The auxiliary motor is operated either in a forward or in a reverse direction for varying the resistance included in the circuit of the auxiliary magnet in order to prevent a hunting action by the regulator and for operating a rheostat included in the circuit of the rotor winding to govern the speed of the induction motor.

The single figure of the accompanying drawing is a diagrammatic view of a regulator system embodying our invention.

Referring to the drawing, an induction motor 1, embodying a stator 2 and a wound rotor 3, is connected to a supply circuit 3ᵃ and is adapted to perform any suitable work by means of a shaft 4. A small direct-current generator 5 of a suitable character is connected to, and is operated by, the induction motor 1 in any convenient manner, as by means of a belt 5ᵃ. The armature of the generator 5 is electrically connected to a main-control element 6 which serves to govern the speed of the induction motor 1 in a manner to be hereinafter set forth.

The main control element 6 comprises two main contact terminals 7 and 8, which are operated by an auxiliary magnet 9, and a main contact terminal 10, which is operated by a main control electromagnet 10ᵃ. The auxiliary magnet 9 embodies a winding 11, which is connected, through a resistor 12, to a direct-current supply circuit embodying conductors 13 and 14, and a core armature 15, which is pivotally connected to a contact arm 16. The contact arm 16 is pivotally mounted at 17 and is provided with a bifurcated end portion which carries the main contact terminals 7 and 8.

The main control electromagnet 10ᵃ is provided with a winding 18, which is connected, through an adjustable resistor 19, to the armature of the generator 5, and a core armature 20 which is pivotally connected to a contact arm 21. The contact arm 21 is pivotally mounted at 22 and carries the main contact member 10, which is disposed between the co-operating contact members 7 and 8. The adjustable resistor 19, which is included in circuit with the winding 18, is adjusted to regulate the main control element 6 and to maintain the induction motor 1 at any desired speed.

Two switches 23 and 24, which are operated by the main control element 6, are adapted to operate an auxiliary motor 25 either in a forward or in a reverse direction. The switch 23 embodies a winding 26, which is connected across the supply conductors 13 and 14 when the contact members 7 and 10 are in engagement with each other, and two switch members 27 and 28. The switch members 27 and 28 connect the motor 25 across the supply conductors 13 and 14 to operate it in a counter-clockwise direction for increasing the speed of the induction motor 1. The switch 24 embodies a winding 29, which is connected across the supply conductors 13 and 14 when the contact members 8 and 10 are in engagement with each other, and two switch members 30 and 31. The switch members 30 and 31 connect the motor 25 across the supply conductors 13 and 14 for operating it in a clockwise direction. The operation of the motor 25 in a clockwise direction will decrease the speed of the induction motor 2 in a manner to be hereinafter set forth.

A rheostat 33, which governs the energization of the auxiliary magnet 9, and a rheostat 34, which controls the resistance included in the circuit of the rotor winding 3 of the induction motor 1, are controlled, in any suitable manner, by the auxiliary motor 25, as by means of a shaft 35, which is directly connected to the armature of the auxiliary motor. The rheostat 34 embodies three resistor sections 36, 37 and 38, which are respectively connected to the slip rings 39, 40 and 41 of the induction motor 1 and are adjusted by means of the arms 42 which are mounted on the shaft 35. The rheostat 33 embodies a resistance element 43 that is controlled by means of an arm 44 which is mounted on the shaft 35.

Assuming the apparatus of the system to be in the positions illustrated in the drawing and the speed of the motor 1 to be reduced below normal value, then the speed of the generator 5 is lowered to such point that the energization of the main control magnet is reduced to permit engagement between the contact members 7 and 10. Upon engagement of the contact members 7 and 10, the switch 23 is operated for rotating the motor 25 in a counter-clockwise direction and thus reduce the portions of the resistance elements 36, 37 and 38, which are included in the circuit of the rotor winding 3. Consequently, the speed of the induction motor 1 is increased. Simultaneously with the operation of the rheostat 34 by the motor 25, the rheostat 33 is operated to increase the energization of the auxiliary magnet 9 and to actuate the contact arm 16 in a manner to separate the contact members 7 and 10.

In case the induction motor has not been raised to normal speed, then the main control magnet 10$^a$ will again effect engagement between the contact members 7 and 10 for operating the rheostat 34 by means of the auxiliary motor 25, to further decrease the portions of the resistor section 36, 37, 38, which are in circuit with the rotor winding 3. The vibratory action of the control element continues until the induction motor is returned to normal speed.

In case the induction motor 1 is operating above normal speed, then the main control magnet 10$^a$ is operated by the increased voltage generated by the generator 5 to close the contact members 8 and 10. The contact members 8 and 10, by means of the switch 24, effect operation of the auxiliary motor 25 in a clockwise direction so that the resistance included in the circuit of the rotor winding 3 is increased. In a similar manner, the resistor 43 is operated to reduce the energization of the auxiliary magnet 9 and to separate the contact members 8 and 10 so that a hunting action of the main control element 6 is prevented.

Modifications in the system and arrangement and location of parts may be made within the spirit and scope of our invention and we desire, therefore, that only such limitations shall be imposed as are indicated in the appended claims.

We claim as our invention:

1. The combination with an induction motor having a rotor winding and a resistor in circuit with said rotor winding, of a main control element operated in accordance with the speed of the induction motor, an auxiliary motor operated by said element, and means operated by said auxiliary motor for varying said resistor to maintain the induction motor at constant speed and for reacting on the main control element to prevent hunting action.

2. The combination with an induction motor having a rotor winding and a resistor in circuit with said rotor winding, of a main control element operated in accordance with the speed of the induction motor and means governed by said element for varying said resistor to maintain the induction motor at constant speed and for reacting on the main control element to prevent hunting action.

3. In combination, an induction motor, a generator operated by the motor, a regulator device operated by said generator, and means controlled by said device for maintaining the motor speed substantially constant and for preventing hunting action.

4. In combination, an induction motor having a wound rotor, a contact regulator, and means governed by said regulator for automatically varying the rotor circuit to maintain the speed of the motor substantially constant, and for preventing hunting action.

5. The combination with an induction motor, of a dynamo-electric machine operated by said motor, a main control element operated by said machine, and means governed by the main control element for maintaining the motor at a substantially constant speed and for reacting on the main control element to prevent hunting action.

6. The combination with an induction motor, a generator operated by said motor, a regulator device controlled by said generator and having a main control electromagnet and an auxiliary electromagnet, and means controlled by said device for maintaining the motor at a substantially constant speed and for preventing hunting action.

7. In a regulator for an induction motor, a generator operated by the motor, a main control element operated by the generator, an auxiliary motor governed by said main control element, and means operated by the auxiliary motor for controlling the speed of the induction motor and for preventing hunting action by the main control element.

8. In a regulator for an induction motor, a main control element, means for operating said element in accordance with the motor speed, an auxiliary motor governed by said element, and means operated by the auxiliary motor for preventing hunting action by said element and for governing the speed of the induction motor.

9. In a regulator for an induction motor, the combination with a generator operated by the motor, and a main control element operated by said generator and comprising an auxiliary and a main control electromagnet, of an auxiliary motor governed by said control element, a rheostat operated by said auxiliary motor for governing the operation of the main motor, and a resistor operated by the auxiliary motor for controlling the operation of said auxiliary magnet to prevent hunting action by the main control element.

10. The combination with a polyphase induction motor, a main control element comprising an auxiliary electromagnet and a main control electromagnet, means for operating the main control electromagnet in accordance with the speed of the induction motor, and means operated by the main control element for governing the operation of the induction motor and for selectively operating the auxiliary electromagnet in a manner to prevent hunting action by the main control element.

11. In combination, an alternating-current motor, control means operated in accordance with the speed of said motor, regulator means operated by said control means for automatically governing the speed of the motor, and means operating concurrently with said regulator means for preventing hunting action.

12. In a regulator for an induction motor, a generator operated by the motor, a regulator having a main control element operated by the generator, an auxiliary motor governed by said main control element, and means operated by the auxiliary motor for controlling the speed of the main motor and for reacting on the main control element to prevent hunting action.

13. In combination, an induction motor, a generator operated thereby, a regulator operated by said generator, and means controlled by said generator for maintaining the motor speed substantially constant and for reacting upon said regulator to prevent hunting action.

In testimony whereof, we have hereunto subscribed our names this 25th day of March, 1919.

WILLIAM M. BRADSHAW.
CLARENCE A. BODDIE.